3,267,090
VISCUMIC ACID AND SALTS THEREOF

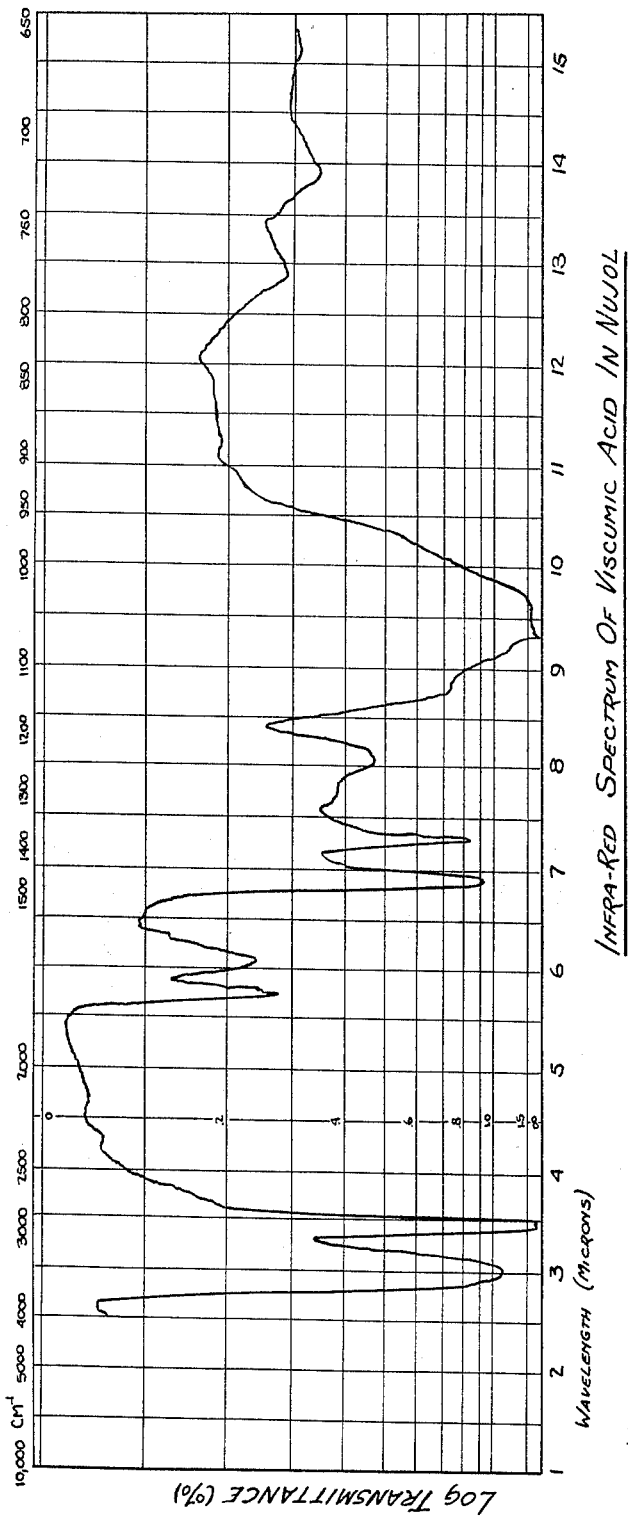

Johannes Mueller, Arlesheim, Switzerland, assignor to Ciba Corporation, New York, N.Y., a corporation of Delaware
Filed Aug. 6, 1963, Ser. No. 315,190
Claims priority, application Switzerland, Sept. 8, 1960, 10,219/60
10 Claims. (Cl. 260—209)

This is a continuation-in-part of my copending application Serial No. 136,911, filed September 8, 1961 and now abandoned.

The present invention relates to a new polysaccharide and its prepartion. More particularly it concerns a new tumour-inhibiting polysaccharide in substantially pure form obtainable from plant material of Viscum album (mistletoe) or Loranthus species, more especially *Loranthus europaeus* L, and a process for the preparation of this polysaccharide from said plant material.

Mistletoe has been used medicinally for many centruies. In particular its curative effect on epilepsy and vertigo has been described in Pliny in the second century A.D. In recent times mistletoe preparations have also been used in the treatment of high blood pressure, vascular diseases and arteriosclerosis. The preparations used in such cases are crude or so-called total extracts to which is also attributed a certain curative effect in the treatment of cancer diseases. It is therefore not surprising that it has already been attempted to prepare active principles from plant material of *Viscum album*. Apart from choline and acetylcholine, urson and certain resin alcohols, primarily viscotoxin (K. Winterfeld and M. Leiner, Naturwissenchaften, vol. 42, (1955), page 487) was isolated. This product is a polypeptide distinguished by its effect on the heart and in addition by very strongly irritant and necrotic properties. To these necrotic properties of viscotoxin was attributed the shrinking of vaccination tumours observed in mice on intratumoural administration of total extracts of mistletoe.

However, the extremely toxic properties of viscotoxin render the intravenous administration of this substance or of total extracts difficult, and the effect of such a systemic treatment on the growth of tumours, compared with the practically unimportant intratumoural treatment, is dubious, to say the least.

The present invention is based on the observation that it is possible to isolate from plant material of *Viscum album* and Loranthus species, more especially the oak mistletoe (*Loranthus europaeus* L) which is very similar to *Viscum album*, a pure polysaccharide to which we have given the name "viscumic acid." Viscumic acid on systemical e.g. intravenous application, inhibits or slows down the growth of tumours in animals, such as mice and rats and higher mammals and the like. Viscumic acid is distinguished by the absence of effects on the blood pressure and of other undesirable effects of mistletoe total extracts or of viscotoxin. Consequently it can be used to alleviate the condition of mammal organisms threatened by the growth of tumours. A curative effect, however, on human concer has not yet been established in clinical tests. Furthermore, viscumic acid has a stimulating effect upon the granulopoiesis and can therefore be used in cases of agranulocytosis.

According to our examinations viscumic acid is a polysaccharide which, as has been revealed by hydrolytic cleavage and paper chromatographic examination of the cleavage products, is composed predominantly of galactose and arabinose, and contains in addition also rhamnose and a uronic acid, possibly glucuronic acid. Viscumic acid has a $pK_s$ value of 3.9 (c.=$1.1 \cdot 10^{-2}$ (val./liter)). The quotient of its molecular weight with the number of free carboxyl groups determined by tritration in an aqueous solution is about 1900. The quotient calculated from the amount of carbon dioxide (precipitated and weighed as $BaCO_3$) liberated by hydrolysis of viscumic acid in hydrochloric acid of 12% strength, is about 1500. The elementary analysis of viscumic acid gives the following results: values obtained by two analyses): C, 43.50; 43.73%, H, 6.41; 6.07, (C) $-CH_3$ 2.11; 1.99%; N, 0.2%). Viscumic acid is soluble in water and dimethylformamide.

The ultra-violet spectrum contains no absorption bands, while the infra-red spectrum in nujol (FIG. 1) contains the following bands (in m$\mu$): maxima at 2.95–3.00; 5.74; 6.03; shoulder at 7.2 with maximum at 8.00–8.05. The optical rotation in water (1.47%) is for the sodium-D-line (after clarification by ultracentrifugation):

$$[\alpha]_D^{25} = -26.7 \pm 1°$$

for the following mercury lines:

$$[\alpha]405 \ m\mu = -59.5 \pm 1°$$
$$436 \ m\mu = -50.7 \pm 1°$$
$$546 \ m\mu = -31.0 \pm 1°$$
$$578 \ m\mu = -27.2 \pm 1°$$

The sedimentation constant (Sm) of neutralized viscumic acid in sodium chloride solution of 2.67% strength of 20° C. is $3 \cdot 10^{-13}$ (c.=1.34%). The relative viscosity ($\eta$ rel.) is 1.39 (c.=0.44% in 0.1-molar sodium chloride solution at 25° C.).

The tumour-inhibiting effect of viscumic acid was tested on the following vaccinatable solid tumours:

Mouse tumours: Crocker Sarcoma 180, Ehrlich Carcinoma (solid form) and Adeno-Carcinoma EO 771.

Rat tumours: Walker Carcinosarcoma 256, Uterus epithelion T–8 Guérin and Flexner-Joblin Carcinoma.

The preparation was administered daily for 6 days intraperitoneally. The aqueous solutions were freshly prepared every day. The effect on the tumour was determined 2 days after termination of the treatment.

The results are summarized in the following table:

| Tumour: | Inhibitive strength |
|---|---|
| Crocker Sarcoma 180 | + |
| Ehrlich Carcinoma | + |
| Adenocarcinoma EO 771 | ++ |
| Walker Carcinosarcoma 256 | ++ |
| Uterus epitheliom T–8 Guérin | ++ |
| Flexner-Joblin Carcinoma | +++ |

Explanation of symbols:
+++=strong inhibitive effect.
++=medium strong inhibitive effect.
+=slight inhibitive effect.

As will be realized from the above table, the Flexner-Joblin Carcinoma is inhibited most strongly. Medium strong inhibitive effects are observed with Uterus epitheliom T–8 Guérin, Walker Carcinosarcoma 256 and Adenocarcinoma EO 771, the effect on the latter being more distinct.

Further experiments have elicited the fact that haematopoiesis is not inhibited. Cytological examinations suggest that there is an effect noticeable on nucleic acids, possible by way of an influence on the structural units of sugar.

In the process for the manufacture of viscumic acid plant material of *Viscum album* or Loranthus species, more especially *Loranthus europaeus* L., is extracted with water or expressed and the extract or juice respectively is then dialysed, whereupon the known active principles such, for example as viscotoxin, pass into the dialysate while viscumic acid remains behind. The undialysable portion (for which in the claims the expression retentate is used) of the extract obtained in this manner still contains ballast substances which are separated, whereupon viscumic acid in pure form, possibly as a metal salt thereof or as a mixture of the two forms, is obtained.

As starting material for the extraction with water or for the preparation of the juice there are used above all the ripe berries of the aforementioned plants, especially of *Viscum album*, or leaves of said plants. The whole berries may be used or only the kernels or the pulp. The extraction is advantageously performed with cold water. The extracts are advantageously freed from undissolved constituents by centrifugation.

The extract or juice obtained in this manner is then exhaustively dialysed, advantageously with a conventional semi-permeable diaphragm, above all cellophane, for example cellophane tubing having a pore diameter of 2.5–8.0 mμ, the dialysis being performed against tap water and finally against distilled water. The residual (undialysed) solution is then advantageously concentrated, preferably under reduced pressure, if possible in a rapid evaporator, or by lyophilization, or by a combination of these methods, using at first a rapid evaporator and then a lyophilizator. The extract obtained in this manner contains viscumic acid or salts thereof with metals (for example, sodium, calcium, magnesium and the like) present in the plants in an enriched form and has already at this stage a distinct tumour-inhibitive action.

For isolating viscumic acid or salts thereof a variety of methods is available. A preferred method is fractional precipitation with water-miscible organic solvents, above all dioxane, lower aliphatic alcohols, for example glycols such as ethyleneglycol, diethyleneglycol, propyleneglycol, methoxyethanol, diethyleneglycol monomethyl ether, diethyleneglycol monoethyl ether, ethyleneglycol monoacetate, polyethyleneglycol, more especially alkanols such as methanol or propanol, or ketones such as alkylketones, for example acetone or methylethylketone, above all ethanol. The desired fraction containing viscumic acid or salts thereof is easy to identify by way of its tumour-inhibiting biological properties. With ethanol, for example, viscumic acid is obtained by adding ethanol to its aqueous solutions and isolating the precipitate obtained at an alcohol concentration of 55–75%. The precipitate can be isolated in the conventional manner, for example by centrifugation. The precipitation can be repeated, whereby the purity of viscumic acid or salts thereof can be further enhanced. The precipitations can also be carried out in the presence of adsorbents such as Hyflo or the like, or in the presence of a strong electrolyte to facilitate the precipitation.

According to another method for isolating pure viscumic acid or salts thereof electrophoresis is used; it is carried out in the conventional manner and the fraction aimed at can again be identified by its tumour-inhibitive action. Quite generally it can be stated that viscumic acid is present in the stationary fraction or in the fraction which travels slowly towards the anode, while the fractions travelling at a greater speed consist of ballast substances.

Finally, viscumic acid can also be purified by precipitating the contaminants with a quaternary ammonium compound, more especially one that contains a long carbon chain with more than 8 carbon atoms, for example cetyl trimethylammonium chloride, cetyl ethyl dimethylammonium chloride, cetyl dimethyl benzylammonium chloride, cetyl pyridinium chloride, β-phenoxyethyl dimethyl dodecylammonium chloride, or the corresponding bromides, iodides or hydroxides.

In the course of the aforementioned purification certain contaminants form with the quaternary ammonium compound sparingly soluble complexes which can be separated in the known manner, for example by centrifugation. The amount of quaternary ammonium compound to be added can be varied within wide limits, care being taken not to add too great an excess thereof because in such a case the complex compounds formed would dissolve partially. The complexes formed are then separated by centrifugation or filtration and the filtrate containing the active principle is freed from excess ammonium salt by dialysis against distilled water. The pure active principle is then obtained by lyophilization from the undialyzable portion.

It is also possible to use ammonium compounds for precipitating viscumic acid or salts thereof, if the purification is performed in a borate buffer of about $p_H = 10$.

Depending on the conditions employed viscumic acid is obtained in the free form or in the form of a salt or of a mixture of both. From the salts free viscumic acid can be prepared in the usual manner, for example with the aid of cation exchangers or by way of dialysis against a dilute acid. From the free acid metal salts can be prepared in the usual manner, for example salts of alkali or alkaline earth metals.

The invention includes also any variant of the process in which the methods described above are combined in any desired form and/or are complemented by further purification operations or assistants or are replaced by equivalent process or in which other plant material containing viscumic acid is used.

Viscumic acid or salts thereof can be used as medicaments as explained above. They may be applied, for example, in the form of pharmaceutical preparations containing the new compound in conjunction with pharmaceutical organic or inorganic vehicles suitable for parenteral administration. The pharmaceutical preparations may be, for example, in the form of dry ampoules containing, for example, 0.1–5 mg., preferably 0.5 mg. of the active material. They may be sterilized and/or may contain assistants such as preserving, stabilizing, wetting or emulsifying agents, salts for regulating the osmotic pressure or buffers. They may also contain further therapeutically valuable substances.

The following examples illustrate the invention:

*Example 1*

8 kilograms of ripe mistletoe berries are squashed between stone rollers and then stirred in an ice-cooled vessel in 12 liters of ice-cold distilled water for 3 hours. Very intensive stirring must be ensured by using two propellor agitators rotating in opposite directions (Taifun) the vanes of which must however not have too sharp edges. During the stirring the very viscid slimy substance swells and is mechanically disintegrated and thus gradually passes into solution. The substance is left to itself for some time to enable the skins and kernels of the berries to settle and the viscous solution is then ladled into a sack centrifuge rotating at not too high a speed. The extraction vessel and the centrifuge are rinsed with 3–5 liters of cold distilled water. The centrifugate which has been freed from solid particles but is still turbid is then poured into 10 cellophane tubes and dialyzed at first against a large volume of ice-cold continuously renewed tap water and then against 200 liters of ice-cold distilled water renewed in that amount at least 6 times. The dialyzate is discarded, the undialysable fractions (contents of tubes) combined and the whole is concentrated at a solvent temperaure of about 30° C. in a rapid evaporaor under reduced pressure to a volume of 1.7 liters. Freeze-drying of this highly viscous solution yields 240 grams of a substantially colorless, floccular precipitate (Preparation 22,303 D) which contains viscumic acid in an enriched form and has an anti-tumour effect which persists for an unlimited time.

*Example 2*

400 grams of Preparation 22,303 D are dissolved in 6 liters of ice-cold distilled water by intensively stirring for 3 hours. Within about 3 hours 12 liters of absolute alcohol are then added dropwise to the well-stirred solution and the whole is stirred on for 16 hours at 0° C. The colorless, floccular precipitate is allowed to settle and the supernatant yellow solution, which contains sugar and low-molecular polysaccharides, is then decanted. The sediment is centrifuged and the solid substance washed on a glass suction filter with 50 cc. of aqueous alcohol of 75% strength. The residue is then dissolved by intensive stirring in 1.5 liters of distilled water and 0° C. and the resulting highly viscous solution is freed from undissolved floating particles by centrifugation (Laval centrifuge). By lyophilizaiton the clear solution is converted to 82 grams of a colorless floccular product having a high anti-tumour activity (Preparation 24,467 A). The latter product is viscumic acid in admixture with its metal salts occurring in the plant.

*Example 3*

The mixture of berry skins and kernels remaining in the sack centrifuge after the extraction described in Example 1 can be separated by floatation into the lighter skins and the specifically heavier, green and rather hard berry kernels. In this manner 8 kg. of berries yield about 400 g. of kernels.

100 grams of kernels are disintegrated in 150 cc. of water, centrifuged through a layer of 40 grams of Hyflo Supercel, the residue and the filter assistant are washed twice with 50 cc. of distilled water on each occasion and the filtrate is dialyzed, first against ice-cold tap water and then against ice-cold distilled water (see Example 1). The undialyzable material (about 350 cc.) is cautiously concentrated under vacuum to a volume of 40 cc. (containing about 20 grams of solids). As described in Example 2 this solution is treated with thorough stirring with 80 cc. of absolute alcohol and there is obtained Preparation 25,236 A, which is likewise a mixture of viscumic acid and salts thereof and has a good tumour-inhibitive action.

*Example 4*

It has repeatedly been observed that when mistletoe berries are collected the material is infested with microorganisms (for example with hay bacillus or the like). The manufacture of sterile preparations can be carried out by interposing a treatment with formaldehyde at a suitable stage of the concentration procedure, for example in the following manner:

400 grams of Preparation 22,303 D (see Example 1) are dissolved by being intensively stirred for 3 hours at 0° C. in 6 liters of distilled water, a small amount of undissolved floating material is removed by centrifugation, and viscumic acid is precipitated by dropping in 12 liters of absolute alcohol in the course of 3 hours and then stirring on for 16 hours at 0° C. The separation of the precipitate from the yellow filtrate is carried out as described in Example 2. The residue is then dissolved by intensive stirring in 2 liters of distilled water, 50 cc. of formaldehyde solution of 40% by volume strength are added, and the mixture is left to itself for 24 hours at room temperature. The solution is then dialyzed against 10 times its own volume of distilled water (which is frequently renewed) until the dialysate no longer forms a residue which has the odour of formaldehyde. The sterile solution of the undialyzable phase is lyophilized in a sterile apparatus, to yield 82 grams of a floccular brilliantly white Preparation 26,327 which is a mixture of viscumic acid and metal salts thereof and is free from micro-organisms.

*Example 5*

20 grams of enriched viscumic acid obtained as described in Example 1 are shaken for ½ hour with 300 cc. of distilled water, the turbidity is removed by filtering through 5 grams of Hyflo Supercel and the filter cake is rinsed. The washings are added to the solution to make a total volume of 320 cc. 20 grams of Hyflo are added, a fine stream of 590 cc. of absolute alcohol is stirred into this solution and the mixture is stirred on for 15 minutes. The Hyflo charged with the precipitate is allowed to settle and then filtered through a sinter glass filter. The polysaccharide material is extracted from the Hyflo residue with water.

The filtrate which has a volume of about 900 cc. is again mixed with 20 grams of Hyflo Supercel. Another 370 cc. of absolute alcohol are then stirred in as described above and the precipitate is suctioned off. To isolate the polysaccharide fraction the Hyflo residue is extracted with water.

The filtrate is then concentrated on a circulation evaporator under vacuum to a volume of 200 cc., 20 grams of Hyflo are added to the aqueous solution, and a further fraction of polysaccharide is precipitated by stirring in 800 cc. of absolute alcohol. The reaction mixture is filtered through a glass suction filter G3, to leave behind a clear yellow filtrate which is substantially free from polysaccharides. The Hyflo residue is agitated three times with 100 cc. of distilled water on each occasion as mentioned in connection with the precipitations described above, filtered through a glass suction filter and rinsed with water. On lyophilization the aqueous extract yields a colorless, floccular powder. The amounts of substance obtained by the individual precipitations are shown in the following table:

| Precipitation | Alcohol concentration in percent | Residue in grams |
| --- | --- | --- |
| 1 | 65 | 3 |
| 2 | 75 | 2.9 |
| 3 | 80 | 3.9 |

Residual solution (low molecular constituents) which cannot be precipitated: 45 grams.

The precipitates so obtained are separately dissolved and again precipitated at alcohol concentrations of 65, 75 and 80% respectively. All precipitates containing 65% of alcohol, all of 75% and all of 80% alcohol are then combined. When this fractional precipitation and selective combination of all identical fractions is carried out a third time, preparations of polysaccharides are obtained which differ by their decreasing molecular weight. The precipitate containing 65% of alcohol is a mixture of viscumic acid and its metal salts in a very pure form, while the precipitate containing 75% of alcohol ballast substances in addition to viscumic acid and its salts, and the precipitate containing 80% of alcohol is almost wholly inactive, that is to say it contains no viscumic acid.

*Example 6*

4 kg. of mistletoe berries are expressed in a hydraulic press with a pressure of 100 tons and the press cake is rinsed with a small amount of distilled water, to yield about 4 liters of juice which is dialyzed in cellophane tubes against distilled water as described in Example 1, the undialyzable material being converted to enriched viscumic acid as described in Example 1.

*Example 7*

49 grams of mistletoe berry kernels are extracted as described in Example 3 and yield 10 grams of dry extract (lyophilizate) of which 4 grams are dissolved in 70 cc. of water and exhaustively dialyzed in a cellophane tube against distilled water. Lyophilization of the undialyzable material yields 0.85 gram of Preparation 20,101 $B_2$ as a colorless, floccular product, which is an enriched mixture of viscumic acid and salts thereof.

This mixture can be converted to very pure viscumic acid as follows:

A solution of 240 mg. of the substance in 50 cc. of borate-hydrochloric acid buffer of pH 8.51 (according to Soerensen) is subjected to electrophoresis in a Tiselius apparatus at a voltage of 260 volts (current intensity 52 milliamperes) and a temperature of 3.5 to 5° C. for 6½ hours, only the leg on the anode side being charged with the substance. The following three constituents can be identified:

(1) a constituent that migrates rapidly toward the anode, (2) a constituent that migrates slowly towards the anode, and
(3) a constituent that does not leave the point of origin.

The fractions can be isolated by being extracted about every 2 hours. The viscumic acid is contained in the stationary fraction, while the other two fractions are inactive. The viscumic acid is obtained by dialyzis against distilled water followed by lyophilization.

Example 8

A solution of 1.35 grams of Preparation 22,303 D obtained as described in Example 1 in 40 cc. of borate-hydrochloric acid buffer of pH 8.51 (according to Soerensen) is freed from floating particles in a high-speed centrifuge and subjected to electrophoresis in a density gradient prepared by mixing borate-hydrochloric acid buffer (pH 8.51) with a concentrated solution of cane sugar. The cathode is at the top and the anode at the bottom of the column. 4 weakly fluorescent zones can be distinguished in ultra-violet light. On completion of the operation they are separately extracted from the column and freed from low-molecular contaminants in cellophane tubes by exhaustive dialysis against distilled water. The undialyzable portion is converted in each case to a dry powder by lyophilization. The following fractions can be isolated:

| Zone | Behaviour in the electric field | Tumour-inhibiting effect |
| --- | --- | --- |
| 1 | Travelling very fast towards anode | Inactive. |
| 2 | Travelling fast towards anode | Very active ⎫ viscumic |
| 3 | Travelling slowly towards anode | Very active ⎭ acid. |
| 4 | Stationary | Little active material. |

Example 9

A solution of 5 grams of Preparation 26,327 obtained as described in Example 4 in 20 cc. of water is percolated through a basic ion exchanger resin (Dowex 1x8, OH-form; 20 cc.) and then through an acidic ion exchanger (Dowex 50x8; H-form; 20 cc.), each time rinsing with about 75 cc. of distilled water. The polysaccharide solution, freed in this manner from inorganic ions, is then continuously dialyzed in a chamber-stirring dialyzator against 60 liters of distilled water for 70 hours and finally freed from a small amount of floating particles in an ultra centrifuge (rotating at 12,590 r.p.m., for 35 minutes). Lyophilization of the clear solution yields a floccular, silky preparation of free viscumic acid (Preparation 28,316).

Free viscumic acid has the same tumour-inhibiting action as mixtures of the acid and salts thereof, but it is easier to determine analytically. It possesses the aforementioned physical properties.

Example 10

In a chamber-stirring dialyzator equipped with cellophane diaphragms ("Cuprophan" and "Cellopack") a solution of 1 gram of Preparation 26,327 in 20 cc. of water is subjected to continuous dialysis, first against 20 liters of 0.01 N-hydrochloric acid and then against 20 liters of distilled water (until sodium and chlorine ions can no longer be detected). The undialyzable portion is then taken out and lyophilized, to yield a colorless, silky preparation of viscumic acid (Preparation 28,316).

Example 11

50 mg. of viscumic acid (Preparation 28,316) are dissolved in 1 cc. of formic acid of 85% strength, sealed in a glass tube and heated for 2 hours at 110° C. The formic acid is then evaporated under vacuum, the last traces being removed by repeated evaporation with absolute alcohol. The hydrolyzate is then chromatographed on paper (systems: n-propanol/ethyl acetate/water 7:1:2 and ethyl acetate/pyridine/water 2:1:2). The substances that can be identified are: preponderantly galactose and arabinose, in addition a small amount of rhamnose and a uronic acid, possibly glucuronic acid.

Example 12

50 mg. of viscumic acid (Preparation 28,316) are dissolved in 3 cc. of N-sulfuric acid, sealed in a glass tube and heated for 4 hours at 110° C. After cooling, a few undissolved flocks are filtered off and the filtrate is neutralized with 7 cc. of saturated barium hydroxide solution (approximately 0.2–0.3 normal) until Congo red changes color, and then adjusted with a pinch of barium carbonate to pH=about 7. The precipitated barium sulfate is filtered through a thin layer of Hyflo Supercel, the filter residue is extracted by being boiled with 20 cc. of water, and the aqueous extract is combined with the first filtrate and evaporated to dryness under vacuum. The paperchromatographic examination is carried out in the systems described in Example 11. The following substances are identified as main constituents of viscumic acid: Galactose, arabinose, rhamnose and probably an aldobiuronic acid.

Example 13

A solution of 200 mg. of viscumic acid (Preparation 28,316) in 10 cc. of hydrochloric acid of 12% strength is refluxed at an oil bath temperature of 140–150° C. under nitrogen for 5 hours. The liberated carbon dioxide is absorbed in barium hydroxide solution and the precipitated barium carbonate is thoroughly dried and then weighed. Yield: 27 mg. of barium carbonate, corresponding to about 6 mg. of carbon dioxide, corresponding to a molecular weight of about 1500 related to 1 molecular proportion of uronic acid.

Example 14

50 mg. of viscumic acid (Preparation 28,316) are dissolved in 3 cc. of distilled water, sealed in a glass tube and heated for 4 hours at 110° C. After cooling, a few undissolved flocks are filtered off and the hydrolysate is evaporated to dryness under reduced pressure. The paperchromatogram reveals the following picture: From the molecule of viscumic acid substantially only arabinose is eliminated. Furthermore, a weak spot is observed which could be attributed to 2-desoxy-galactose.

Example 15

A solution of 50 mg. of viscumic acid (Preparation 28,316) in 3 cc. of n-sulfuric acid is kept in a closed vessel in the dark for 1 week at room temperature. The sulfuric acid is then removed with barium hydroxide and barium carbonate as described in Example 12. The paperchromatogram of the hydrolysate of viscumic acid reveals the same pictures as obtained in Example 14 by hydrolysis with hot water.

Example 16

12.7 grams of Preparation 22,303 D (see Example 1) are dissolved in 150 cc. of water by being agitated for 4 hours. The remaining floating particles are then separated by centrifugation. The aqueous solution (150 cc.) is then vigorously stirred and cooled in an ice bath and 300 cc. of acetone are dropped in, 10 grams of Hyflo are added and the whole is stirred for another hour at 0° C. The precipitate is easy to separate with the aid of a glass suction filter. The filter cake is rinsed with 70% of aqueous acetone. The precipitated high-molecular material is caused to dissolve by repeated extraction of the Hyflo residue with distilled water, and the clear solution is lyophilized to yield 6.0 grams of a purified preparation of viscumic acid in admixture with its metal salts.

Example 17

2.0 grams of Preparation 22,300 A, a crude product corresponding to Preparation 22,303 D, which has been additionally purified by filtration by means of Hyflo, are dissolved in 40 cc. of water. 5 cc. of a solution of 20% strength of $\beta$ - phenoxyethyl-dimethyl-dodecylammonium chloride are then added dropwise with stirring and cooling with ice. The reaction mixture is allowed to stand for several days at a low temperature (0° C.) and the initially strong turbidity settles in the form of a flaky precipitate which may be separated by filtration. The filtrate is subjected to dialysis against distilled water in a cellophane tube. The contents of the tube are lyophilised to yield 1.15 grams of a colorless, flaky product which is viscumic acid in admixture with its salts.

*Example 18*

2.0 grams of Preparation 26,327 are dissolved with stirring in distilled water and the volume made up to 2 liters. The solution is filtered under sterile conditions through a diaphragm filter (product of Membranfiltergesellschaft Goettingen No. 6). Portions of 2.5 cc. each of this solution are charged into phials of 10 cc. capacity, freeze-dried under aseptic conditions at −40° C., lyophilized at a final temperature of +20° C. and the phials are immediately sealed. It must be ensured that during this procedure the preparation is not exposed to strong ultra-violet radiation as long as it is in the form of the aqueous solution. In the dry state the product is less sensitive to ultra-violet light.

What is claimed is:

1. Process for the manufacture of a new polysaccharide in substantially pure form, which comprises the steps of exhaustively dialysing against water a member selected from the group consisting of a water-extract and a juice of a plant material selected from the group consisting of *Viscum album* and Loranthus species and isolating a member selected from the group consisting of viscumic acid and its alkali and alkaline earth metal salts from the retentate of the dialysis by fractional precipitation with water-miscible organic solvents.

2. Process for the manufacture of a new polysaccharide in substantially pure form, which comprises the steps of exhaustively dialysing against water a member selected from the group consisting of a water-extract and a juice of a plant material selected from the group consisting of *Viscum album* and Loranthus species and isolating a member selected from the group consisting of viscumic acid and its alkali and alkaline earth metal salts from the retentate of the dialysis by electrophoresis.

3. Process for the manufacture of a new polysaccharide in substantially pure form, which comprises the steps of exhaustively dialysing against water a member selected from the group consisting of a water-extract and a juice of a plant material selected from the group consisting of *Viscum album* and Loranthus species and isolating a member selected from the group consisting of viscumic acid and its alkali and alkaline earth metal salts from the retentate of the dialysis by removal of impurities by precipitation with quaternary ammonium compounds containing a carbon chain with more than 8 carbon atoms followed by separating the aqueous solution, dialysis and lyophilization.

4. Process for the manufacture of a new polysaccharide in substantially pure form, which comprises the steps of exhaustively dialysing against water a member selected from the group consisting of a water-extract and a juice of a plant material selected from the group consisting of *Viscum album* and Loranthus species and isolating a member selected from the group consisting of viscumic acid from the retentate of the dialysis by precipitation of viscumic acid with quaternary ammonium compounds containing a carbon chain with more than 8 carbon atoms at a pH of about 10.

5. Process as claimed in claim 1, wherein *Loranthus europaeus* L. is used as starting material.

6. Process as claimed in claim 1, wherein ethanol is used as precipitating agent.

7. Process as claimed in claim 3, wherein $\beta$-phenoxyethyl-dimethyl-dodecylammonium chloride is used as precipitating agent.

8. Process as claimed in claim 6, wherein a concentration of 55 to 75% ethanol is used for precipitation.

9. A member selected from the group consisting of viscumic acid and an alkali and an alkaline earth metal salt thereof, said viscumic acid being characterized by having (1) in the U.V. spectrum, no absorption bands, (2) in the I.R. spectrum, maxima at 2.95–3.00 m$\mu$; 5.74 m$\mu$ and 6.08 m$\mu$, a shoulder at 7.2 m$\mu$ with maxima at 8.00–8.05 m$\mu$, (3) an optical rotation in water, after clarification by ultracentrifugation of $[\alpha]_D^{25}=-26.7\pm1°$ and for the mercury lines $^{[\alpha]}$405 m$\mu$, 436 m$\mu$, 546 m$\mu$ and 578 m$\mu$, the rotation $-59.5\pm1°$, $-50.7\pm1°$, $-31.0\pm1°$ and $-27.2\pm1°$, respectively, (4) the elementary analysis: =43.63%; H=6.24%; (C) —$CH_3$=2.05% and N=0.2% and (5) a $pK_s$ value of 3.9 (c.$=1.1\times10^{-2}$ (val./liter)).

10. Process as claimed in claim 1, wherein *Viscum album* is used as starting material.

References Cited by the Examiner

Chemical Abstract, vol. 37, 1943, pp. 3507–3508.
Chemical Abstract, vol. 45, 1951, p. 3912 (a).

LEWIS GOTTS, *Primary Examiner.*

JOHNNIE R. BROWN, *Assistant Examiner.*